W. T. CHILDS.
WINDING MACHINE.
APPLICATION FILED JAN. 2, 1915.
1,263,855.
Patented Apr. 23, 1918.
2 SHEETS—SHEET 1.
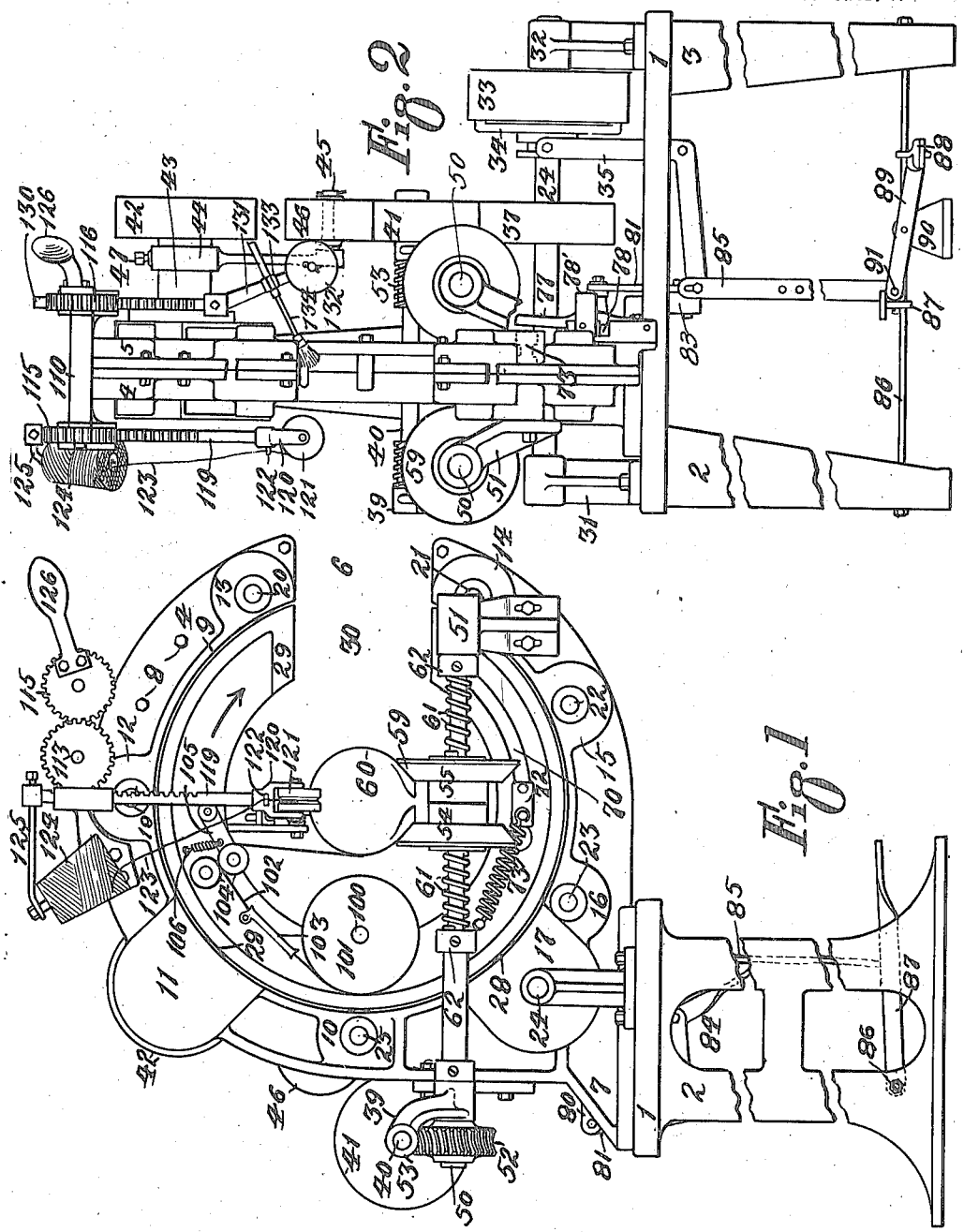

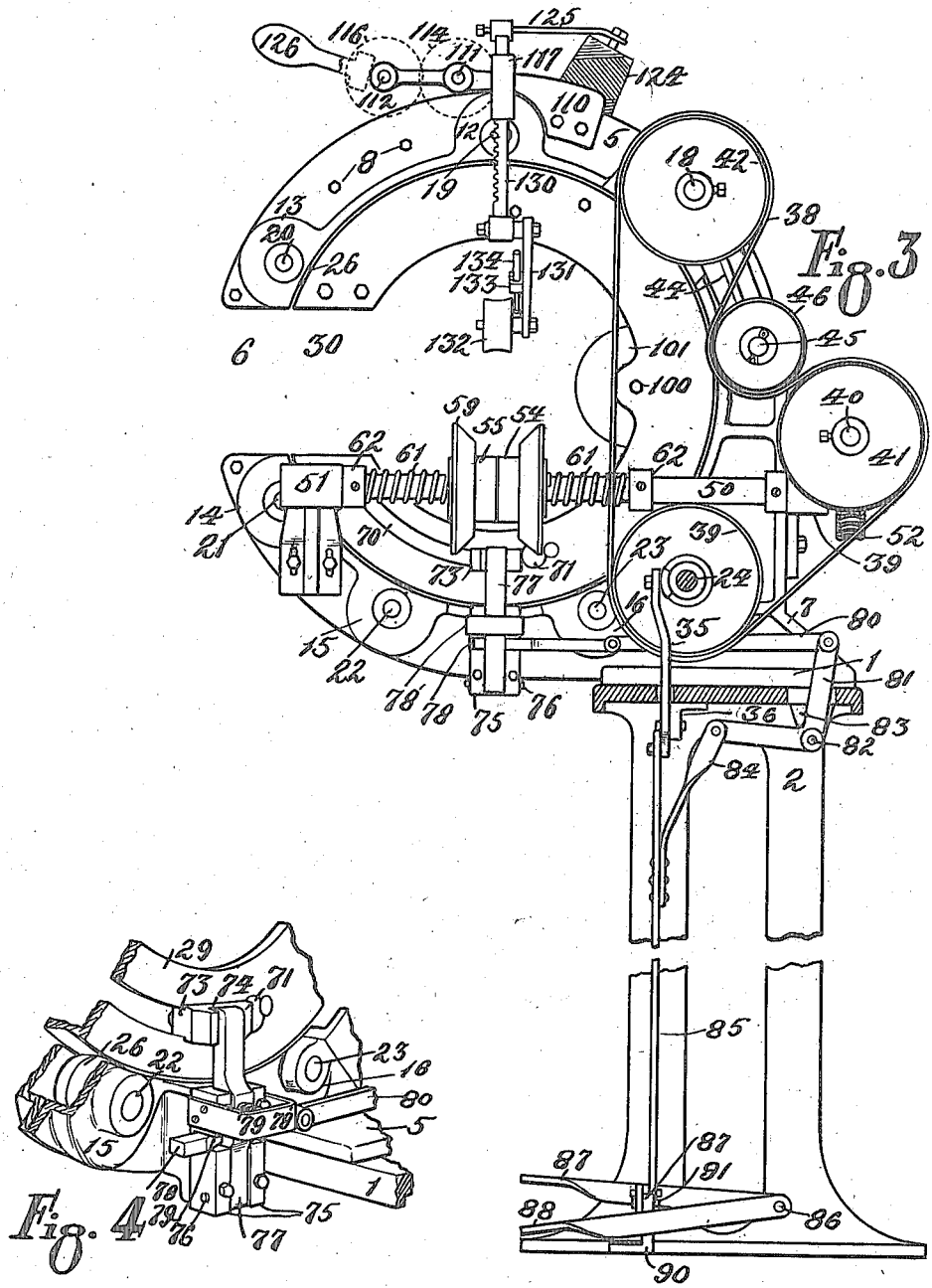

UNITED STATES PATENT OFFICE.

WILBUR T. CHILDS, OF AKRON, OHIO, ASSIGNOR TO THE AKRON RUBBER MOLD AND MACHINE COMPANY, OF AKRON, OHIO, A CORPORATION OF OHIO.

WINDING-MACHINE.

1,263,855. Specification of Letters Patent. Patented Apr. 23, 1918.

Application filed January 2, 1915. Serial No. 139.

*To all whom it may concern:*

Be it known that I, WILBUR T. CHILDS, a citizen of the United States, residing at Akron, in the county of Summit and State of Ohio, have invented new and useful Improvements in Winding-Machines, of which the following is a specification.

This invention relates to improvements in machines for helically winding a strip of suitable material on an object, and has especial relation to machines for so placing a strip of paper or fabric on an annular tire or tire shoe.

The object of the invention is to provide a simple, compact, easily operated machine, capable of rapidly winding a strip helically about an object and provided with means for placing on the object, if desired, a flexible member beneath the helical strip which may be utilized to tear the strip from the object when desired.

A further object of the invention is to provide means whereby certain portions of the edge of the helically-placed strip may be coated with an adhesive, so that the successive and overlapping layers would adhere together to thereby obviate the necessity of a circumferentially-placed binding or finishing strip.

A still further object is to provide suitable mechanism for interrupting the revolution of that portion of the mechanism on which is mounted the bobbin carrier so that the opening therein will always register with the opening in the supporting frame to permit the placement and removal of an annular object such as a tire or tire shoe.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1, is a view in side elevation of a device embodying this invention;

Fig. 2, is an end elevation looking from the right of Fig. 1;

Fig. 3, is a view in side elevation with portions omitted looking from the right in Fig. 2; and, Fig. 4, is an enlarged detail of a portion of the mechanism employed.

The device embodies a table 1 supported by legs 2 and 3 positioned at opposite ends thereof, and if desired, formed integral therewith. Mounted on the upper face of the table 1 are a pair of complementary housings 4 and 5 both of which are somewhat in the form of a capital letter C, or in other words, have an annular portion interrupted to provide a space 6 between their separated ends. On the opposite sides of the housings 4 and 5 and integral therewith are base portions 7 which seat on the table 1. The two members 4 and 5 embody outwardly-extending radial flanges which abut and are secured to each other through the medium of holding devices 8, and these flanges are further provided at their inner portions with laterally and outwardly-extending flanges 9. Preferably formed integral with the outwardly-extending flanges of the members 4 and 5 are oppositely-disposed hollow enlargements 10, 11, 12, 13, 14, 15, 16 and 17. These hollow enlargements constitute chambers through which extend shafts 25, 18, 19, 20, 21, 22, 23 and 24 respectively. Mounted on shafts 19, 20, 21, 22, 23 and 25 are idler rolls 26 preferably formed of vulcanized fiber and with slightly convexed peripheries. Mounted on the shafts 18 and 24 are driving frictional rollers 28 of large diameters but substantially of the same construction as the rollers 26.

Adapted to be mounted on the inner opposing peripheral surfaces of the rollers 26 and 28 is a shuttle 29 in the form of a broken annulus and with a space 30 between the separated ends thereof corresponding to the opening 6 between the ends of the housings 4 and 5. The shuttle 29 is L-shaped in cross section and preferably provided with a concave face to receive the convexed rollers 26 and 28 to prevent lateral movement thereof.

The shuttle 29 is revolved by the following mechanism: The shaft 24 which constitutes the driving shaft and on which one of the rollers 28 is mounted is supported in a pair of upright bearings 31 and 32 on the table 1.

Loosely mounted on the shaft 24 is a clutch member 33 having the outer face thereof fashioned to receive the belt for rotating it. The opposite member 34 of the clutch is splined on the shaft 24 and is shifted through the medium of a bell-crank lever 35 fulcrumed on a bracket 36 secured to the under face of the table 1. The shaft 24 bears a pulley 37 over which runs a belt 38. Mounted in suitable bearings 39 secured to the rear face of the housings 4 and 5 is a counter-shaft 40 on which is a belt pulley 38. The housing 5 is provided with a laterally-projecting apertured boss 43 through which the shaft 18 extends and mounted on this boss is an adjustable arm 44 bearing at its free end a shaft 45 on which is an idler pulley 46. This pulley 46 is adapted to engage the belt 38 between the pulleys 41 and 42 and constitute a belt-tightener and is locked against movement through the medium of a set screw 47. It will be seen that when clutching engagement is established between the members 33 and 34, motion is communicated from the belt-pulley 37 by means of the belt-pulley 38 to the pulleys 41 and 42 so that the shafts 40 and 18 are rotated thereby. The two driving rollers 28 being mounted on the shafts 18 and 24 serve to rotate the shuttle by frictional engagement with the peripheral surface thereof.

In order to support an object, more especially an annular object, such as a tire or tire-shoe, in a position to receive a helically-placed strip, the following mechanism is employed; The brackets 39 are provided with openings constituting bearings for shafts 50 positioned at right angles to the shaft 40 and the extended ends of these shafts 50 are supported in bearings 51 secured to the outer faces of the housings 4 and 5 near the separated ends thereof. These shafts 50 bear worm wheels 52 which intermesh with worms 53 on the shaft 40 and receive motion thereby. The speed of revolution of the shafts 50 is much slower than the speed of the shaft 40. Splined on each of the shafts 50 are two supporting rollers 54 and 55 each of which is provided with a wide flange 59 preferably fashioned with inclined peripheries. These inclined faces are opposed to each other and serve to support an object such for instance, as a tire 60. These rollers 54 and 55 are constantly forced toward each other through the medium of coiled springs 61 the tension on which is capable of being adjusted through the medium of collars 62. The inward thrust of the spring impelled rollers 54 and 55, serves to pinch the edges or sides of a tire together for tight wrapping, as well as provide for tires of different size. In view of the fact that the rollers 54 and 55 on each of the shafts 50 are splined thereon they rotate in unison therewith and consequently an object as a tire is constantly revolved on its own axis and the entire surface of the annular object passes through the space inclosed by the shuttle 29.

In order to arrest revolution of the shuttle accurately and abruptly so that the opening 30 between the ends of the shuttle will register with the opening 6 between the ends of the housings 4 and 5 the following means are employed: The lower part of the radial flange of the shuttle 29 is provided with a circular slot 70 concentric with the axis of the shuttle and at one end of this slot is placed an elastic bumper 71. Slidably mounted in the slot 70 is a lug 73 having enlarged heads and a contracted central portion, the width of which is such as to permit the lug to slide in the slot 70 and the heads thereof constitute means to hold the lug from lateral displacement. The lug 73 is connected with the shuttle by means of an exceedingly stiff coiled spring 73'. In the opposite face of the lug 73 is a notch 74. Immediately below the position occupied by the lug 73, when the openings 6 and 30 are in registration, and secured to the flanged portion 9 of the housing 5 are a pair of lugs 75 between which extends a pin 76 on which is mounted a latch 77 extending upwardly and lying in the path of the notched portion of the lug 73 and of suitable size to engage therein. Extending between the lugs 75 is a yoke 78' constituting an abutment for a coiled spring 79 the normal tendency of which is to force the latch 77 inwardly toward the shuttle to cause it to interengage with the notch 74. The inner face of the latch 77 as well as the lugs 75 are slotted to provide an opening having an inclined face (not shown) through which extends an operating bar 78 provided with an inclined portion 79 adapted to coöperate with the similarly-fashioned face of the latch 77 so that when the bar 78 is shifted transversely of the latch 77 the latter is swung on its pivot pin 76 away from the lug 73 and is returned by the spring 79. Pivotally secured to the operating bar 78 is a link 80 the opposite end of which is pivotally connected with a bell-crank 81 fulcrumed on a pin 82 on a bracket 83 and the opposite end of which is pivotally connected to a link 84 secured to a connecting rod 85 the upper end of which is loosely connected with a bell-crank 35. Extending between the legs 2 and 3 of the table 1 is a bar 86 to which is pivotally secured a pair of pedals 87 and 88 the outer ends of which are connected by a connecting bar 89 pivotally mounted on a pedestal 90. The lower end of the connecting rod 85 is secured to the pivot pin 91 which serves to connect the pedal 87 with the connecting bar 89.

The operation of this portion of the device is as follows: When it is desired to rotate the shuttle 29 the operator presses down on the pedal 88 which raises the connecting rod 85 through the medium of the connecting rod 89 thereby operating the bell-crank 35 to shift the clutch member 34 into clutching relation with the loosely rotated belt-driven clutch member 33. At the same time, when the connecting rod 85 is raised it oscillates the bell-crank 81 through the medium of the link 84. The oscillation of the bell-crank 81 shifts the link 80 and the operating bar 78 to the right in Figs. 3 and 4, thereby causing the inclined portion of the operating bar and latch 87 to coöperate to withdraw the upper end of the latch out of the notch 74 in the lug 73 permitting free revolution of the shuttle. When it is desired to abruptly terminate revolution of the shuttle and also terminate its motion at such a time as to bring the openings 6 and 30 into registration, the operator presses down on the pedal 87 which through the mechanism already described shifts the operating bar to the left in Figs. 3 and 4 permitting the latch 77 to be forced inwardly by the spring 79 to engage in the notch 74 and at the same time this shifting of the treadle 87 operates the bell-crank 35 to discontinue clutching rotation between the members 33 and 34. When the latch 77 engages the notch 74 it abruptly prevents further movement of the lug 73 while the momentum acquired by the shuttle itself will cause it to make a partial revolution until the force due to the momentum is overcome by the resistance of the coiled spring 73 which then reverses the revolution of the shuttle until the rubber bumper 71 engages the lug 73 and further revolution of the shuttle is prevented, and when in this position the openings 6 and 30 will be in alinement. Experience has shown that no matter how rapidly, of course, within reasonable limits, the shuttle 29 is revolving, the locking latch 77 may be applied and the revolution of the shuttle terminated without sufficient shock to the mechanism to be injurious to the device.

Mounted on a shaft 100 on the shuttle 29 is a spool or bobbin 101 on which is wound a strip 102 of suitable material which is led through a guide 103 and between a pair of rollers 104 one of which is mounted on an oscillating arm 105 pivoted to the shuttle and held in position by means of a spring 106. These rollers 104 constitute frictional rollers for imposing a determinate amount of friction on the strip 102. From the rollers the strip is carried downwardly and applied to the tire 60 and is wound thereon as the shuttle revolves about the tire and the latter revolves on its own axis.

The mechanism for placing a longitudinal flexible member for use in opening the wrapped package and for applying an adhesive to the overlapping portion of the strip is as follows: Secured to the upper portions of the housings 4 and 5 is a bearing 110 in which are mounted a pair of parallel shafts 111 and 112. Mounted on the shaft 111 are a pair of gear wheels 113 and 114 and on the shaft 112 are gear wheels 115 and 116. The bracket 110 is provided with oppositely-disposed tubular bearings 117 and 118 which are provided with vertical slots into which the gear wheels 113 and 114 respectively extend. Secured to the lower end of the rod 119 in a head 120 on which is pivotally mounted a grooved roller 121 and on the head 120 is a tension device 122. Secured to the upper end of the rod 119 is a supporting arm 125 bearing a spool 124 of some flexible member such as a string, cord 123 or the like. The string, cord or other member 123 is carried from the spool 124 through a tension device 122, down to the upper tread portion of the tire 60, and is guided in its placement thereon by means of a grooved roller 121 so that as the tire revolves circumferentially on its support 54 and 55 the flexible member 123 is applied to the tread surface circumferentially and under the helically-placed strip 102 whereby when it is desired to tear off the helically-placed strip the ends of the cord 123 are drawn apart and the covering formed by the strip 102 is torn away sufficiently to permit the easy uncovering of the tire.

Mounted in the bearings 117 is a rod 130 provided with rack teeth to intermesh with the gear 114. Pivotally secured to the lower end of the rod 130 is an arm 131 on the lower end of which is pivotally mounted a roller 132 provided with a concave face adapted when the arm 30 is lowered to run on the outer face of the tread portion of the tire and to press the helical windings of the strip 102 together. Adjustably and detachably held in a keeper 133 on the rod 130 is an adhesive-applying brush 134, which may be immersed in a container of adhesive from time to time as the occasion requires, and so positioned as to just touch the edges of the strip 102 as it is carried from the tension rolls 104 to the tire, to thereby place a small quantity of the adhesive on the under face of the strip and on that portion thereof it will be superposed on the next preceding winding and after the strip has been placed the roller 132 presses the two overlapping portions of the strip together to cause the perfect adhesion of those portions of the strip which cover the tread of the tire.

I claim:—

1. In a wrapping machine a housing in the form of a broken annulus, a rotatable shuttle of similar form, cushioning mechanism for bringing the shuttle to rest with the broken portion registering with the broken portion of the housing, means carried by the shuttle for carrying a roll of wrapping material and a brush for applying adhesive material to the wrapping material.

2. In a wrapping machine a rotatable shuttle, means for supporting and rotating an article to be wrapped, a wrapper carried on the shuttle, a mechanism for applying a cord on the periphery of the article wrapped in advance of the wrapper and adjustable to contact the periphery of the article wrapped to hold the cord thereon in place, adjustable means for applying an adhesive to the wrapping material, and a roller adjustable to contact the periphery of the article wrapped at the rear of the adhesive applying means to press the folds of the wrapping together.

3. In a wrapping machine an annular shuttle housing having an opening, a rotatable shuttle having an opening, a slide member carried by said shuttle, a latch member adapted to engage the slide member and hold the same from movement whereby the shuttle continues its rotation relatively of the slide member and a spring for reversing the rotation of the shuttle an amount equal to the independent movement between the shuttle and slide member to bring the shuttle opening in registration with the shuttle frame opening when the machine is stopped.

4. A wrapping machine comprising a member in the form of a broken annulus, a member constituting a shuttle of similar formation, rollers carried by one of said members, to permit revolution of said shuttle, one of said members having a slot therein, a notched lug slidably mounted in said slot, a spring connecting said notched lug with the member on which it is mounted, a latch carried by the other member and adapted to engage in said notch to lock said shuttle against revolution and hold said shuttle in position with the broken part thereof in registration with the broken portion of said housing.

5. A winding machine comprising a member in the form of a broken annulus, a member constituting a shuttle of similar formation, rollers carried by one of said members to permit revolution of said shuttle, one of said members provided with a slot, a notched lug shiftably mounted in said slot, a cushioning member positioned at the end of said slot, a spring connecting said lug with the member on which it is mounted, a latch on the other member arranged to engage in the notch in said lug for stopping said shuttle so that the broken part thereof is in registration with the broken part of said housing.

6. A winding machine comprising a member in the form of a broken annulus, a member constituting a shuttle of similar formation, rollers carried by one of said members to permit revolution of said shuttle, one of said members provided with a slot, a notched lug slidably mounted in said slot, a latch on the other member adapted to be sprung into the notch in said lug during the revolution of said shuttle whereby said lug is shifted in the slot by the force due to the momentum of said shuttle, and a spring connecting said lug with the member on which it is mounted and arranged to shift the shuttle to bring the broken part thereof and the broken part of the housing into registration.

7. A wrapping machine comprising a rotatable shuttle, a wrapping strip carried thereby, oppositely disposed supporting rollers, means yieldingly holding the same together, a cord supplying mechanism, means for adjusting the same against and away from the article wrapped, an adjustable brush for applying adhesive along one edge of wrapping strip as it is applied to the article wrapped and means for adjusting the brush to contact the strip and out of engagement with the strip.

8. A winding machine comprising a member in the form of a broken annulus, a member constituting a shuttle of similar formation for carrying wrapping material for application on an object, rollers carried by one of said members to permit revolution of said shuttle in said member, a bearing mounted in said shuttle supporting member, a radially-movable rod in said bearing, supporting means on said rod for a spool of cord or the like, means carried at the inner end of said rod for placing the cord on the object circumferentially thereof and mechanism for adjusting said rod to elevate and depress said means, 9. A winding machine comprising a housing member in the form of a broken annulus, a member constituting a shuttle of similar formation for carrying wrapping material for application on an object in the machine, rollers carried by one of said members to permit revolution of said shuttle in said housing, a bearing mounted in said housing, a radially-movable rod in said bearing, supporting means on said rod for a spool of cord or the like, means carried at the inner end of said rod for placing the cord on the object circumferentially thereof, and means for vertically shifting the position of said rod.

10. A winding machine comprising a housing member in the form of a broken annulus, a member therein constituting a shuttle of similar formation, rollers carried by one of said members to permit revolution of said shuttle, a bearing mounted on said housing, a radially-positioned rod in said bearing, an adhesive-applying device secured to said rod, means for radially-shifting said rod, means for supporting an object to permit the same to pass through the opening inclosed by said shuttle, a bobbin on said shuttle, mechanism for carrying a strip of material from said bobbin and helically applying it to said object, said applying means positioned to bring the strip of material into contact with the adhesive-applying device at each revolution of said shuttle, and means to press the various convolutions of the adhesive-coated strip together.

11. In a wrapping machine, a rotatable shuttle carrying wrapping material, and means for applying an adhesive intermittently to the wrapping material once for each rotation of the shuttle.

12. In a wrapping machine, a rotatable shuttle, means for supporting an article to rotate through the shuttle, means for supplying a wrapping strip to wrap the article, and a brush for applying adhesive intermittently to the wrapping strip.

13. In a wrapping machine, a rotatable shuttle, means for rotating an article to be wrapped through the shuttle, means for supplying a wrapper to the article being wrapped, and means for applying an adhesive intermittently to the wrapping.

14. In a wrapping machine, a rotatable shuttle, means for carrying a wrapping, and means for applying an adhesive to the wrapping at stated distances apart.

In testimony whereof I have hereunto set my hand in presence of two subscribing witnesses.

WILBUR T. CHILDS.

Witnesses:
C. E. HUMPHREY,
A. L. McCLINTOCK.